United States Patent
Bates

[11] Patent Number: 5,664,809
[45] Date of Patent: Sep. 9, 1997

[54] CONNECTORS

[76] Inventor: James I. Bates, 16 Rockery Lane, Penn, Wolverhampton, England, WV2 4PV

[21] Appl. No.: 564,350
[22] PCT Filed: Nov. 19, 1993
[86] PCT No.: PCT/GB93/02385
  § 371 Date: Dec. 15, 1995
  § 102(e) Date: Dec. 15, 1995
[87] PCT Pub. No.: WO94/29629
  PCT Pub. Date: Dec. 22, 1994

[30] Foreign Application Priority Data

Jun. 15, 1993 [GB] United Kingdom ............ 9312259
Sep. 9, 1993 [GB] United Kingdom ............ 9318728

[51] Int. Cl.⁶ ............................................. F16L 25/02
[52] U.S. Cl. .............................. 285/48; 285/405; 285/423; 285/148.24; 174/51
[58] Field of Search ............................ 285/48, 50, 174, 285/173, 363, 405, 423; 174/34, 35 C, 51, 35 GC, 35 R; 361/800, 816, 818

[56] References Cited

U.S. PATENT DOCUMENTS 4,980,006  12/1990  Bordner ........................... 285/423

FOREIGN PATENT DOCUMENTS 842233  7/1960  United Kingdom ............ 285/48

*Primary Examiner*—Terry Lee Melius
*Assistant Examiner*—Heather Shackelford
*Attorney, Agent, or Firm*—Cushman Darby & Cushman IP Group Pillsbury Madison & Sutro LLP

[57] ABSTRACT

A connector assembly principally for aviation fuel lines and pipes in which a connector body is conductive whilst a mounting flange is non-conductive. The body and flange are secured together during a moulding stage. The body generally has earthing lugs embedded in its surface to dissipate electrical static charge.

6 Claims, 3 Drawing Sheets

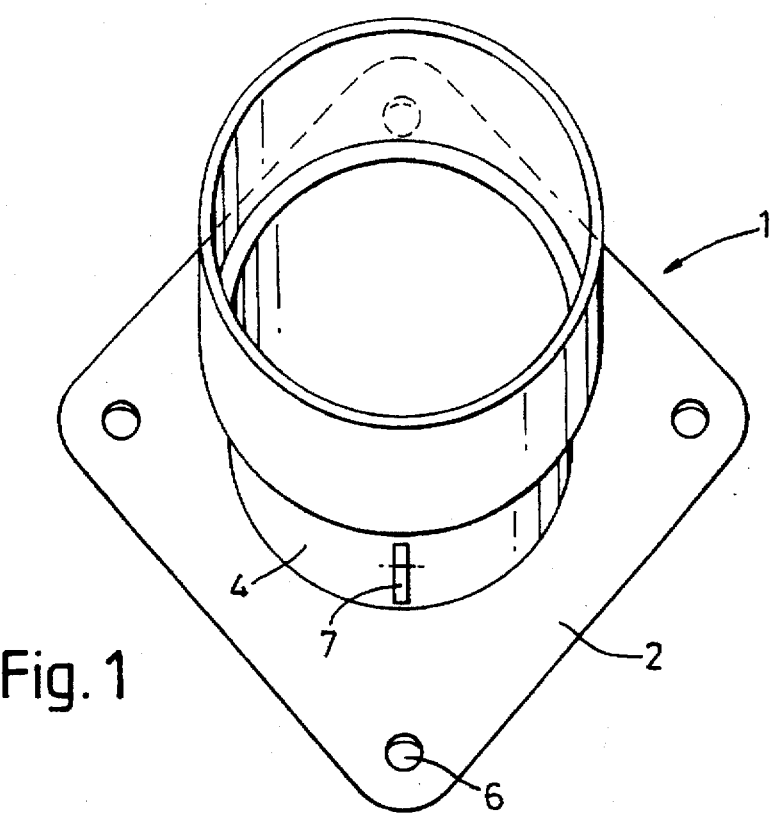
Fig. 1
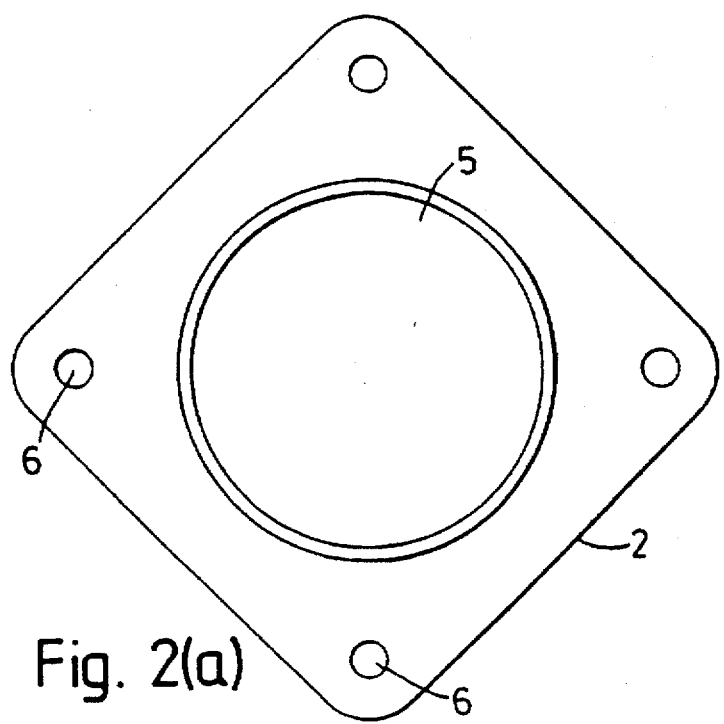
Fig. 2(a)
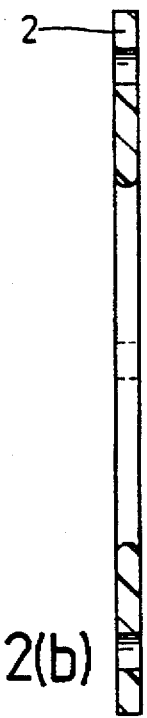
Fig. 2(b)
Fig. 2

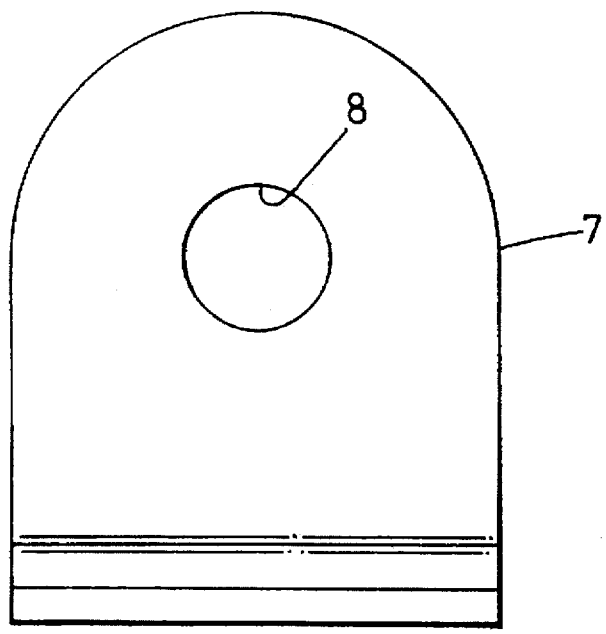
Fig. 3(a)
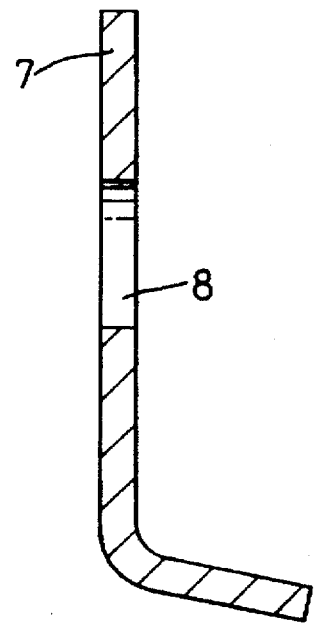
Fig. 3(c)
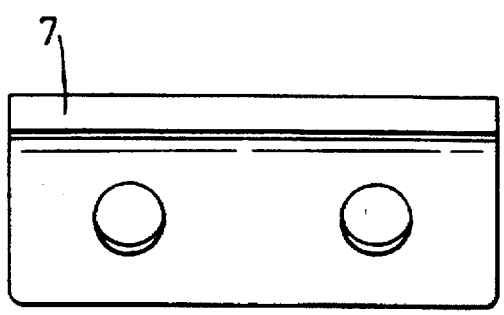
Fig. 3(b)
Fig. 3

CONNECTORS

BACKGROUND OF THE INVENTION

The present invention relates to connectors and more particularly to connectors that are selectively conductive to reduce the possibility of spark ignition of fuel or other flammable liquids that may pass along pipes supported and joined by the connector.

There is a requirement to support pipework within aircraft structures. This support is given by connectors mounted to the aircraft structure. Typically, the pipework will transfer fuel from fuel tanks to aircraft engines. The fuel is under considerable pressure. However, these connectors must be able to accommodate for thermal expansion/contraction within the pipework. Furthermore, the connector must dissipate any static electricity built up along the pipeline. The working or environmental temperature of the connector may be up to 150° C.

Previously, these connectors have been made of aluminium castings in order to ensure mechanical performance and weight optimisation. However, aluminium does have disadvantages and is not an ideal material. Furthermore, a connector made solely of aluminium will be electrically conductive throughout the entire structure. However, in certain circumstances it may be advantageous to have selective electrical conductivity in determined areas of the connector. An example of such a situation is where the non-conductivity would prevent the possibility of galvanic corrosion when the fuel connector is attached to the air frame.

SUMMARY OF THE INVENTION

It is an objective of the present invention to provide a connector that overcomes the above mentioned problems.

In accordance with the present invention there is provided a connector comprising a conductive body and an effectively non-conductive flange, the conductive body having an aperture arranged to support a pipe coupling, the conductive body including conductive lugs embedded in the body to ensure dissipation of any static electrical charge generated in the pipe, the conductive body being secured in position by the flange.

In accordance with a further aspect of the present invention there is provided a method of making a connector including the following stages:

1 Forming an effectively non-conductive flange having an aperture and mounting holes;
2 Forming a conductive lug with conductor holes;
3 Mounting the flange and conductive lugs with mounting and conductive holes aligned in a mould;
4 Forming the connector by injection moulding conductive material whereby the flange and conductive lugs are embedded into position with a bore or holding collar formed to accommodate a pipe in use and the conductive lugs located in that bore or holding collar.

Preferably, the connector is for aviation fuel pipelines.
Preferably, the flange is injection moulded.
Preferably, the conductive lug is pressed, machined or punched.
Preferably, the flange and connector body are formed of glass or carbon reinforced plastics material.
Preferably, the conductive lugs are made from stainless steel.

BRIEF DESCRIPTION OF THE DRAWINGS

An embodiment of the present invention will now be described by way of example only with reference to the accompanying drawings in which:

FIG. 1 is a schematic illustration of the connector,
FIGS. 2a and 2b illustrates plan and side views of a connector flange;
FIGS. 3a, 3b and 3c illustrates front, plan and cross-sectional views of a connector lug.

DESCRIPTION OF THE PREFERRED EMBODIMENTS

Figure 4:
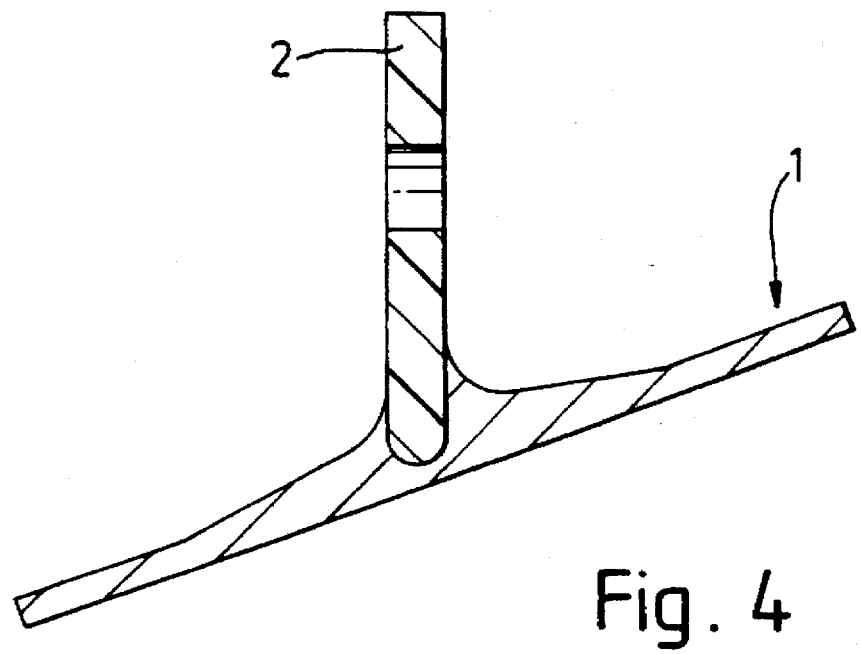
FIG. 4 is a cross-section illustrating the flange connected to the connector body; and,
FIG. 5 is a cross-section illustrating a lug mounted in the connector body.

FIG. 1 illustrates a fuel connector 1 in schematic front plan elevation. The connector 1 comprises a non-conductive flange 2 and connector lugs 7 embedded in the connector surface. Furthermore, the lugs 7 extend into the connector 1 to ensure that good electrical contact with the supported pipe is made through the connector material. Thus, static electrical charge generated in the pipe can be dissipated.

The connector is made by:

1 injection moulding a non-conductive flange 2 from a suitable material such as glass reinforced plastics material (ie QF1006);
2 pressing machining or punching stainless steel to form connector lugs 7;
3 placing one flange and two lugs into a mould and injection moulding conductive body material such as carbon or glass reinforced plastics material to form the connector structure illustrated in FIG. 1.

FIG. 2 illustrates the flange 2 in plan and sectional cross-section. The flange 2 has a large aperture 5 to accomodate the pipe ends. About the aperture 5 are mounting holes 6. These holes 6 position the flange 2 thus also positioning the pipe therein.

FIG. 3 illustrates a connector lug 7 in front, plan and cross-sectional views. The lug 7 is made of pressed steel and provides electrical connection with the pipe so that static electrical charge can be dissipated. Thus, conduction is usually through the conductive body material and so the lugs 7 are embedded in the connector 1. As illustrated, lugs 7 are conventionally angled. However, it will be appreciated that lug 7 shaping is principally determined by final connector shape. The lug 7 has a lug hole 8 to facilitate connection to an electrical earth lead.

The connector 1 supports and connects piping through conductive holding collars 4 (FIG. 1). The pipes are pushed into the collar 4 and sealed by a silicon 'O' ring. However, it will be appreciated that push-fits or other sealing approaches could be used. The collars 4 are made of conductive material with lugs 7 embedded therein.

The connector 1 is rigidly mounted to the air frame through holes 6. Thus, as the flange 2 is effectively non-conductive, there is little possibility of galvanic corrosion when the fuel connector is attached to the air frame.

It will be appreciated that, in suitable situations the bulk of the flange may be conductive with only the area about each mount hole 6 non-conductive. Thus the flange 2 is effectively non-conductive between the collars 4 and the air frame mount points and so galvanic corrosion is inhibited.

It will be appreciated that the present connector could be manufactured from a range of materials.

FIG. 4 illustrates in cross-section the flange 2 connected to the connector body 1. The flange 2 is embedded in the connector 1 during a moulding process. The flange 2 is non-conductive whilst the connector body 1 is conductive. In order to provide some structural stability the connector body 1 about the flange 2 is thicker thus ensuring the flange 1 is well bedded in the connector body 1. The connector body 1 is also chamfered up to the flange 2.

Figure 5:
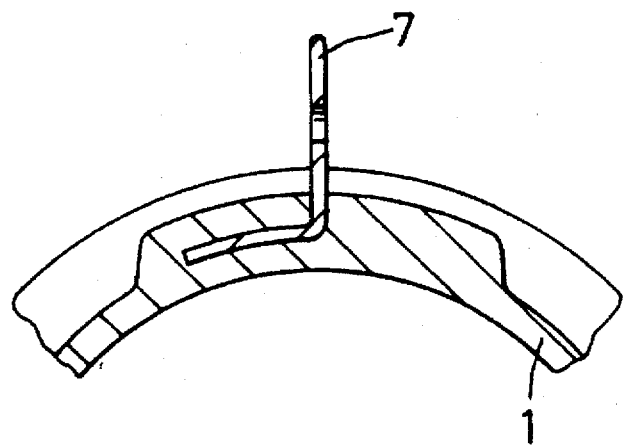

FIG. 5 illustrates in cross-section the lug 7 embedded in the connector 1. The lug 7 is angled to accomodate the curvature of the connector body 1. Furthermore, the connector body 1 has a built-up section to ensure the lug 7 is surrounded by ample material to give mechanical stability.

The connector body 1 has a wall thickness dictated by design and performance requirements. However, a typical thickness could be 4.5 mm to ensure good location of lugs 7.

The depth to which the lugs 7 are embedded is dictated by design and performance criteria. The thickness of the connector body 1 in the vicinity of the flange 2 must not be less than the general thickness specification for the body 1. Otherwise, weak points on the flange/body interface may be introduced.

The angle between the body 1 and the flange 2 is determined by mounting requirements.

I claim:

1. A connector comprising an electrically conductive body (4) and an effectively electrically non-conductive flange (2), the conductive body (4) having an aperture (5) capable of receiving a conduit and being secured in position by the flange (2) characterised in that, the conductive body (4) is provided with conductive lugs (7), one part of which is embedded within the material forming the conductive body (4) and the other part extends outwardly from the conductive body (4).

2. A connector as claimed in claim 1 wherein the connector is for an aviation fuel pipeline.

3. A connector as claimed in claim 1 wherein the flange (2) is injection moulded.

4. A connector as claimed in claim 1 wherein the conductive lug (7) is formed by pressing, machining or punching metal-sheet.

5. A connector as claimed in claim 1 wherein the flange (2) is formed of glass reinforced plastics material.

6. A connector as claimed in claim 1 wherein the conductive body (4) is formed from carbon reinforced plastics material.

* * * * *